US 6,545,830 B1

(12) United States Patent
Briggs et al.

(10) Patent No.: US 6,545,830 B1
(45) Date of Patent: Apr. 8, 2003

(54) DISK DRIVE STORING TEST PATTERN IN CALIBRATION SECTORS THAT ARE LONGER THAN USER DATA SECTORS FOR ZONE PARAMETER CALIBRATION

(75) Inventors: Albert W. Briggs, Newport Beach, CA (US); Phat T. Nguyen, Laguna Niguel, CA (US); Yoo H. Kim, Laguna Niguel, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 201 days.

(21) Appl. No.: 09/846,805

(22) Filed: Apr. 30, 2001

(51) Int. Cl.[7] ................................ G11B 27/36
(52) U.S. Cl. .................. 360/31; 360/48; 360/77.08; 360/78.14
(58) Field of Search .................. 360/48, 27, 77.08, 360/78.14, 31; 324/210, 212, 226

(56) References Cited

U.S. PATENT DOCUMENTS

| 4,780,866 A | * 10/1988 | Syracuse ..................... 360/48 |
| 5,121,260 A | 6/1992 | Asakawa et al. |
| 5,381,359 A | 1/1995 | Abbott et al. |
| 5,392,295 A | 2/1995 | Coker et al. |
| 5,426,541 A | 6/1995 | Coker et al. |
| 5,781,699 A | 7/1998 | Dittmar et al. |
| 5,880,902 A | 3/1999 | Yu et al. |
| 5,954,837 A | 9/1999 | Kim |
| 6,005,731 A | 12/1999 | Foland, Jr. et al. |
| 6,122,131 A | 9/2000 | Jeppson |
| 6,198,584 B1 | * 3/2001 | Codilian et al. ............... 360/48 |
| 6,317,850 B1 | * 11/2001 | Rothberg ..................... 714/704 |
| 6,327,106 B1 | * 12/2001 | Rothberg ..................... 360/53 |

* cited by examiner

*Primary Examiner*—Alan T. Faber
(74) *Attorney, Agent, or Firm*—Milad G. Shara, Esq.; Howard H. Sheerin, Esq.

(57) ABSTRACT

A disk drive is disclosed comprising a disk having a plurality of tracks including a plurality of data tracks and a plurality of reserved tracks. A plurality of embedded servo sectors are dispersed circumferentially around the tracks, the tracks are banded together to form a plurality of zones, each data track comprises a plurality of data sectors each having a first number of bits for storing user data, and each reserved track comprises calibration sectors each having a second number of bits for storing a calibration test pattern, wherein the second number of bits is greater than the first number of bits.

6 Claims, 8 Drawing Sheets

DISK DRIVE STORING TEST PATTERN IN CALIBRATION SECTORS THAT ARE LONGER THAN USER DATA SECTORS FOR ZONE PARAMETER CALIBRATION

CROSS REFERENCE TO RELATED APPLICATIONS AND PATENTS

This application is related to co-pending U.S. patent applications Ser. No. 09/138,805 entitled "DISK DRIVE HAVING DATA-GUARDING FIRMWARE", and Ser. No. 09/484,059 entitled "ERROR RATE MEASUREMENT IN DISK DRIVE BY WEIGHTING DATA-RECOVERY PROCEDURES", the disclosures of which are herein incorporated by reference.

BACKGROUND OF THE INVENTION

1. Field of the Invention

The present invention relates to disk drives for computer systems. More particularly, the present invention relates to a disk drive for storing a test pattern in calibration sectors that are longer than user data sectors for zone parameter calibration.

2. Description of the Prior Art

The zone parameters of a disk drive are typically calibrated during manufacturing and stored in a reserved track on the disk. During spin up, the calibrated parameters are read from the reserved track, stored in volatile semiconductor memory, and used to program the disk drive relative to the radial position of head during read and write operations. The prior art has suggested to recalibrate the zone parameters periodically throughout the life of the disk drive to compensate for changes that occur over time. The calibration procedure involves reading a test pattern from the disk and tuning components of the disk drive in response to reading the test pattern. For example, a read channel component may be tuned so as to minimize a mean-square-error between the samples of an ideal read signal and the read signal generated by reading the test pattern. The test pattern is stored in the data sectors of a reserved track in each zone. However because the data sectors are fixed in length, gaps exist between the data sectors resulting in corresponding gaps while reading the test pattern.

There is, therefore, the need for an improved technique for recalibrating the zone parameters of a disk drive in the field to compensate for changes that occur over time due, for example, to changes in environmental conditions.

SUMMARY OF THE INVENTION

The present invention may be regarded as a disk drive comprising a disk having a plurality of tracks including a plurality of data tracks and a plurality of reserved tracks, and a plurality of embedded servo sectors dispersed circumferentially around the tracks. The tracks are banded together to form a plurality of zones, each data track comprises a plurality of data sectors each comprising a first number of bits for storing user data, and each reserved track comprises calibration sectors each comprising a second number of bits for storing a calibration test pattern, wherein the second number of bits is greater than the first number of bits. The disk drive further comprises a head actuated radially over the disk for writing data to and reading data from the data sectors, and for reading the calibration test pattern from the calibration sectors. The disk drive employs a plurality of zone parameters used to program the disk drive to read user data from a data sector located in a selected one of the plurality of zones. A disk controller calibrates the zone parameters by executing a calibration procedure, wherein the calibration procedure reads the calibration test pattern from at least one of the calibration sectors.

In one embodiment the calibration sectors extend substantially from one servo sector to the next servo sector. In another embodiment, each calibration sector comprises a preamble and sync mark.

The present invention may also be regarded as a method of calibrating a zone parameter of a disk drive in the field. The disk drive comprises a disk comprising a plurality of tracks including a plurality of data tracks and a plurality of reserved tracks, and a plurality of embedded servo sectors dispersed circumferentially around the tracks. The tracks are banded together to form a plurality of zones, each data track comprises a plurality of data sectors each having a first number of bits for storing user data, and each reserved track comprises calibration sectors each having a second number of bits, wherein the second number of bits is greater than the first number of bits. The method comprises the steps of actuating a head radially over the disk for writing data to and reading data from the data sectors, and for reading the calibration test pattern from the calibration sectors. The zone parameter is calibrated by executing a calibration procedure, wherein the calibration procedure reads the calibration test pattern from at least one of the calibration sectors.

DESCRIPTION OF THE PREFERRED EMBODIMENTS

Figure 2:
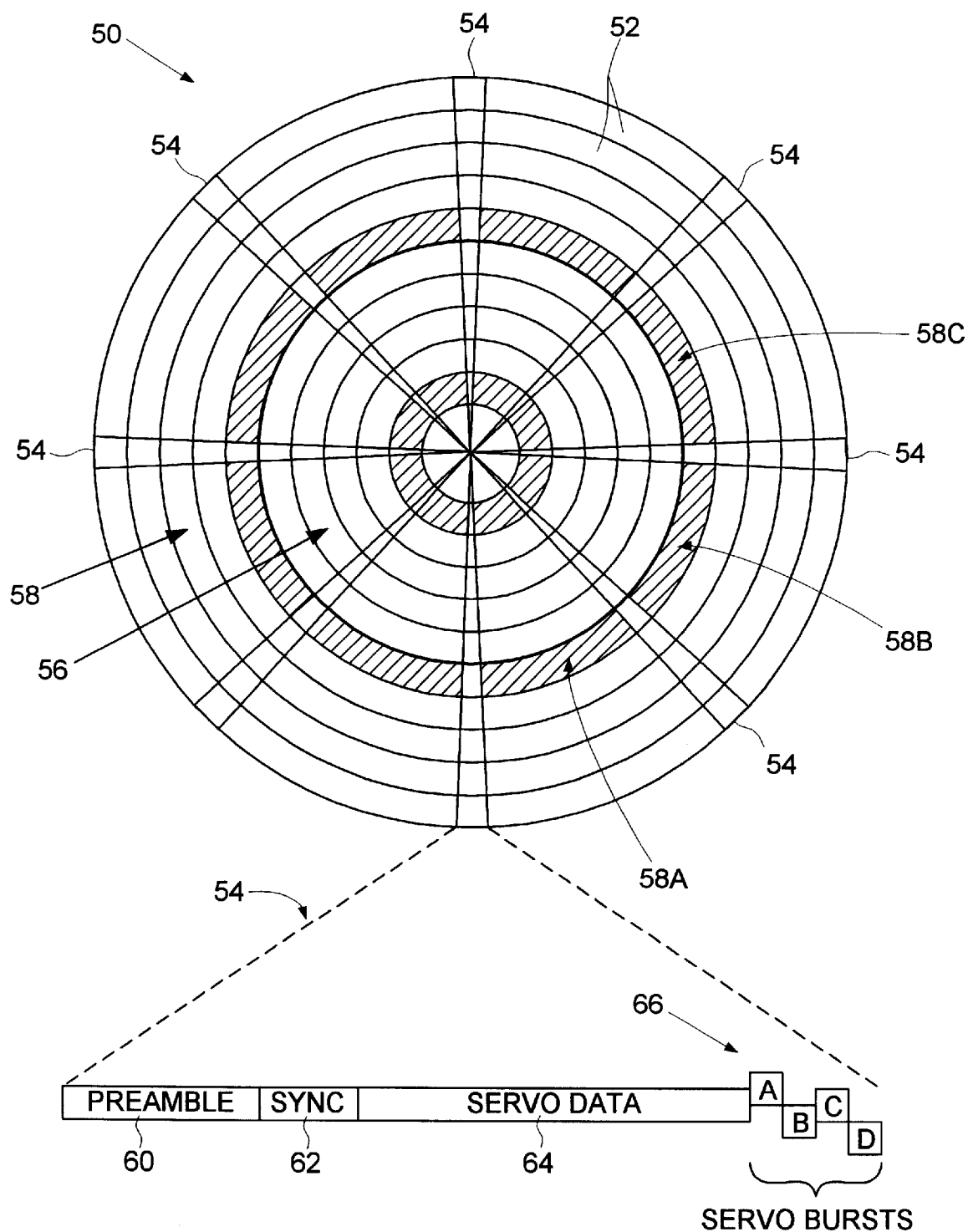
FIG. 2 shows a disk format according to an embodiment of the present invention as comprising calibration sectors that are longer than the data sectors, each calibration sector for storing a test pattern for use in calibrating zone parameters of a disk drive.

FIG. 2 shows a format of a disk 50 according to an embodiment of the present invention as comprising a plurality of tracks 52 including a plurality of data tracks and a plurality of reserved tracks. The disk 50 further comprises a plurality of embedded servo sectors 54 dispersed circumferentially around the tracks 52. The tracks are banded together to form a plurality of zones (e.g., an inner zone 56 and an outer zone 58 in FIG. 2). Each data track comprises a plurality of data sectors each comprising a first number of bits for storing user data, and each reserved track comprises calibration sectors (e.g., calibration sectors 58A–58C) each comprising a second number of bits for storing a test pattern, wherein the second number of bits is greater than the first number of bits. In one embodiment the calibration sectors extend substantially from one servo sector 54 to the next servo sector 54. A plurality of zone parameters are used to program the disk drive employing the disk 50 to read user data from a data sector located in a selected one of the plurality of zones. The zone parameters are calibrated by executing a calibration procedure, wherein the calibration procedure reads the calibration test pattern from at least one of the calibration sectors.

In the embodiment of FIG. 2, a servo sector 54 comprises a preamble 60 for synchronizing timing recovery and gain control within the disk drive, and a sync mark 62 for symbol synchronizing to servo data 64. The servo data 64 comprises coarse servo positioning information, such as a track address, for use in positioning a head over a selected track during a seek operation. The servo sector 54 further comprises servo bursts 66 recorded at precise intervals and offsets to provide fine positioning information for maintaining the head along a desired circumferential path with respect to a target track during a tracking operation. In one embodiment, each calibration sector also comprises a preamble and sync mark.

Figure 1A:
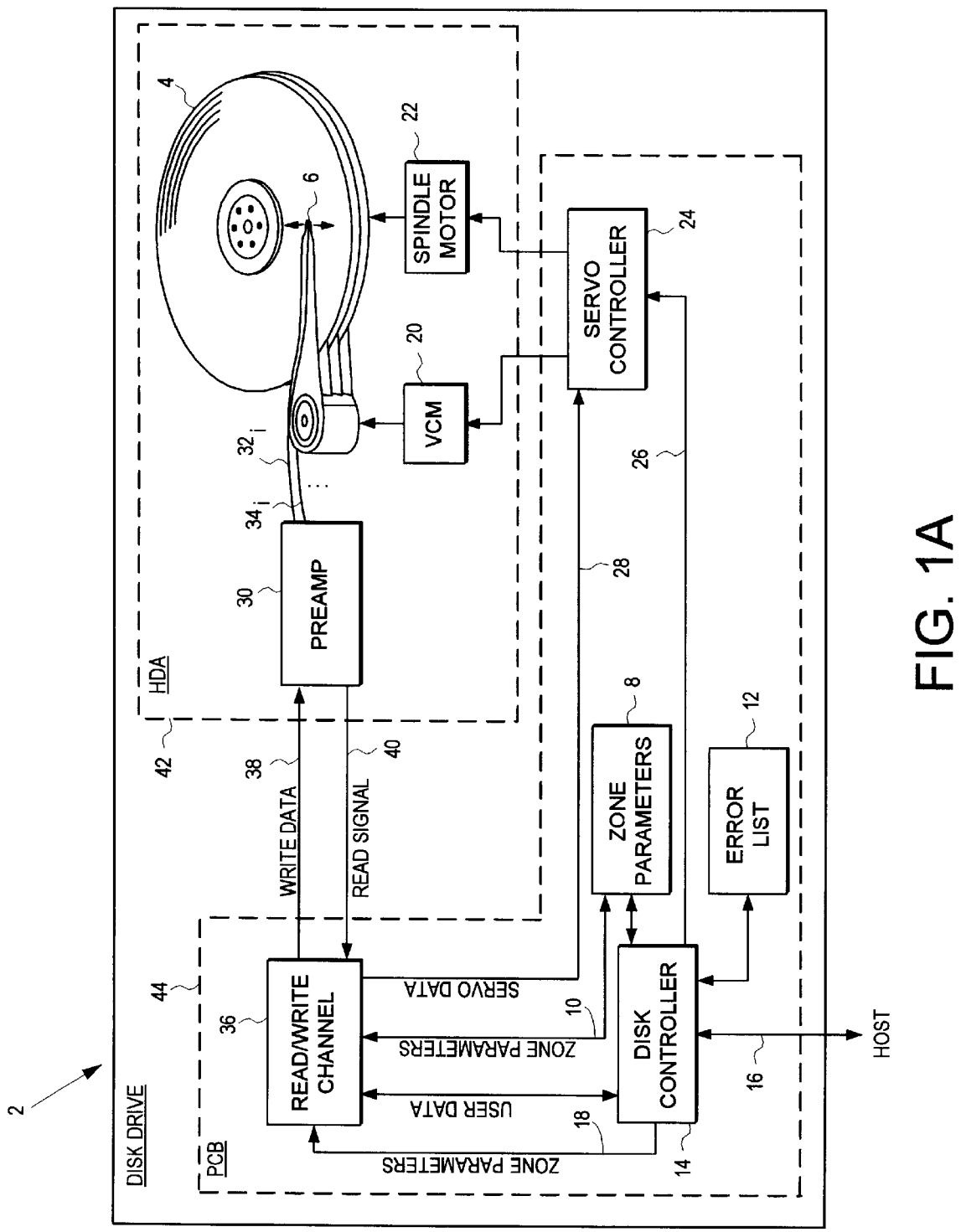
FIG. 1A shows a disk drive according to an embodiment of the present invention employing an error list for recording read errors, wherein the error list is processed during an off-line field calibration to calibrate the corresponding zone parameters.

FIG. 1A shows a disk drive 2 according to an embodiment of the present invention comprising a disk 4 comprising a plurality of tracks, each track comprising a plurality of data sectors, the tracks banded together to form a plurality of zones. The disk drive 2 further comprises a head 6 actuated radially over the disk 4 for writing data to and reading data from the data sectors, and a buffer 8 for storing zone parameters 10 for each of the plurality of zones. The disk drive 2 further comprises an error list 12 for storing entries which identify read errors, and a disk controller 14 for operating in a plurality of states including an active state and an off-line state. During the active state, the disk controller 14 receives a read command 16 from a host computer to read data from at least one of the data sectors, seeks the head 6 to a selected one of the zones comprising the data sector corresponding to the read command, programs the disk drive 2 with the zone parameters 18 corresponding to the selected zone, reads data from the data sector, and detects a read error associated with reading data from the data sector and stores an entry in the error list 12 corresponding to the selected zone. During the off-line state, the disk controller 14 processes the error list 12 to calibrate at least one of the zone parameters 8.

In the embodiment of FIG. 1A, the disk drive 2 comprises a voice coil motor (VCM) 20 for rotating an arm about a pivot in order to actuate the head 6 radially over the disk 4, and a spindle motor 22 for rotating the disk 4 about a center axis. A servo controller 24 generates control signals applied the VCM 20 and spindle motor 22. The disk controller 14 generates the appropriate control signals applied over line 26 to the servo controller 24 in order to seek the head 6 to desired tracks. The servo controller 24 is also responsive to servo data 28, such as a track address and servo burst information recorded on the disk 4 in embedded servo sectors. In one embodiment, the zone parameters 8 are used to program the servo controller 24 relative to the radial location of the head 6 in order to tune the servo controller 24 to operate in the respective zone.

The disk drive 2 of FIG. 1A further comprises a preamp 30 for generating a write signal 32$i$ applied to the head 6 during a write operation, and for amplifying a read signal 34$i$ emanating from the head 6 during a read operation. A read/write channel 36 receives user data from the disk controller 14 during a write operation, and provides encoded write data 38 to the preamp 30. During a read operation, the read/write channel 36 processes a read signal 40 generated by the preamp 30 in order to detect and decode the user data recorded on the disk 4. The decoded user data is provided to the disk controller 14 and ultimately to the host. In one embodiment, the zone parameters 8 are used to program the read/write channel 36 relative to the radial location of the head 6 in order to tune the read/write channel 36 to operate in the respective zone.

In the embodiment of FIG. 1A, the disk 4, head 6, preamp 30, VCM 20 and spindle motor 22 are housed in a head-disk assembly (HDA) 42. The read/write channel 36, disk controller 14, servo controller 24 and memory for storing the zone parameters 8 and error list 12 are implemented in one or more integrated circuits mounted on a printed circuit board (PCB) 44.

Figure 1B:
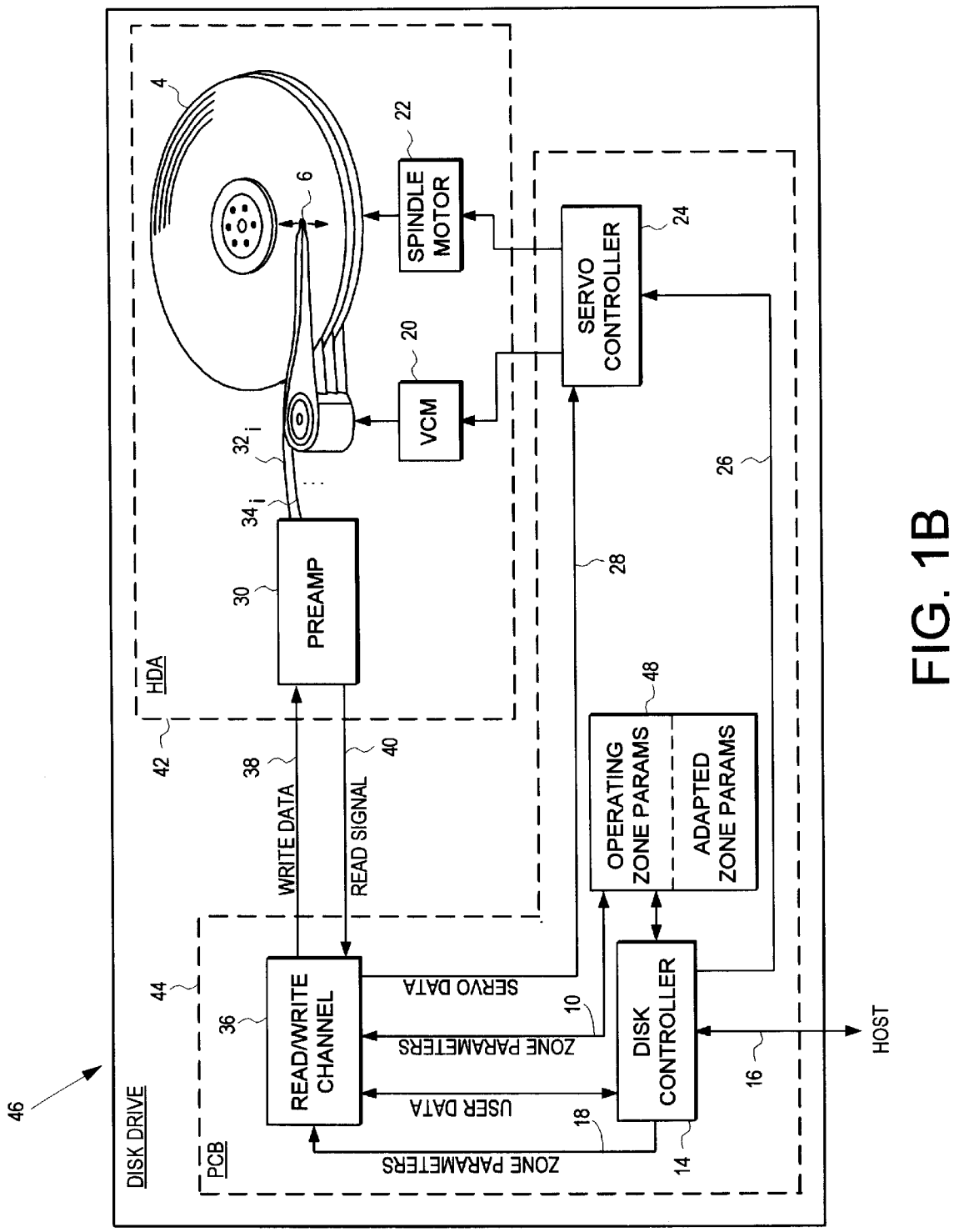
FIG. 1B shows a disk drive according to an embodiment of the present invention wherein operating zone parameters are updated with adapted zone parameters once the reliability of the adapted zone parameters exceeds that of the operating zone parameters.

FIG. 1B shows a disk drive 46 according to an alternative embodiment of the present invention as comprising a disk 4 comprising a plurality of tracks, each track comprising a plurality of data sectors, the tracks banded together to form a plurality of zones, and a head 6 actuated radially over the disk 4 for writing data to and reading data from the data sectors. A buffer 48 stores operating zone parameters and adapted zone parameters for each of the plurality of zones. A disk controller 14 operates in a plurality of states including an active state and an off-line state, wherein during the off-line state the disk controller 14 calibrates at least one of the adapted zone parameters. During the active state, the disk controller 14 seeks the head 6 to a selected one of the zones comprising a data sector corresponding to a read command. The disk controller 14 programs the disk drive 46 with the operating zone parameters corresponding to the selected zone and then reads data from the data sector. If a read error is detected, a data-recovery firmware procedure is executed to recover the data from the data sector using the adapted zone parameters. If the data is successfully recovered from the data sector by the data-recovery firmware procedure, an adapted zone parameter counter is incremented and the operating zone parameters are updated with the adapted zone parameters if the adapted zone parameter counter exceeds a predetermined threshold.

Figure 3:
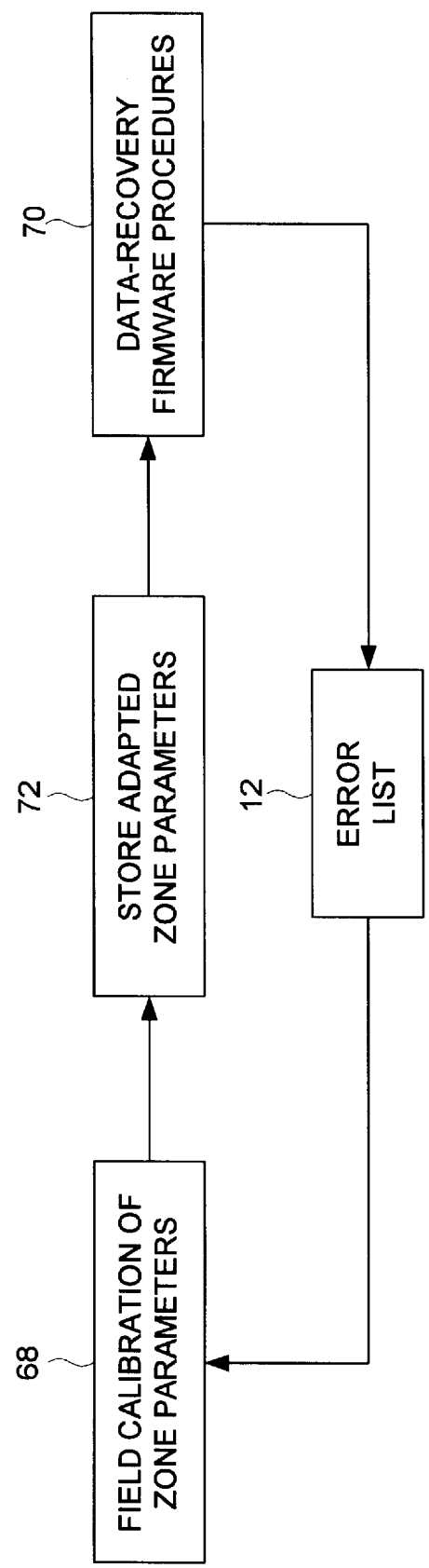
FIG. 3 illustrates how the error list of FIG. 1A is used as feedback during the off-line field calibration of zone parameters.

FIG. 3 illustrates how the error list 12 of FIG. 1A is used to drive the off-line field calibration 68 of the zone parameters. During the data-recovery firmware procedures 70, read errors are added to the error list 12. During the off-line field calibration 68, the entries in the error list 12 are processed to calibrate the zone parameters corresponding to the read errors. The resulting adapted zone parameters are stored 72 and later used by the data-recovery firmware procedures 70 to recover data from marginal data sectors.

In one embodiment, the disk 4 stores a set of manufacturing zone parameters calibrated when the disk drive is manufactured, together with a set of operating zone parameters used to program the disk drive during normal operation. Initially, the manufacturing zone parameters are copied to the operating zone parameters. As the disk drive executes the field calibration procedure, at least some of the operating zone parameters are updated with the adapted zone parameters to improve performance. In this manner, the manufacturing zone parameters are always available as a default operating mode in the event the operating zone parameters migrate toward undesirable values. The manufacturing zone parameters and operating zone parameters are stored in reserved tracks on the disk 4. In an alternative embodiment, the adapted zone parameters are also stored on the disk 4 to enable recovery in the event of a power failure.

Figure 4A:
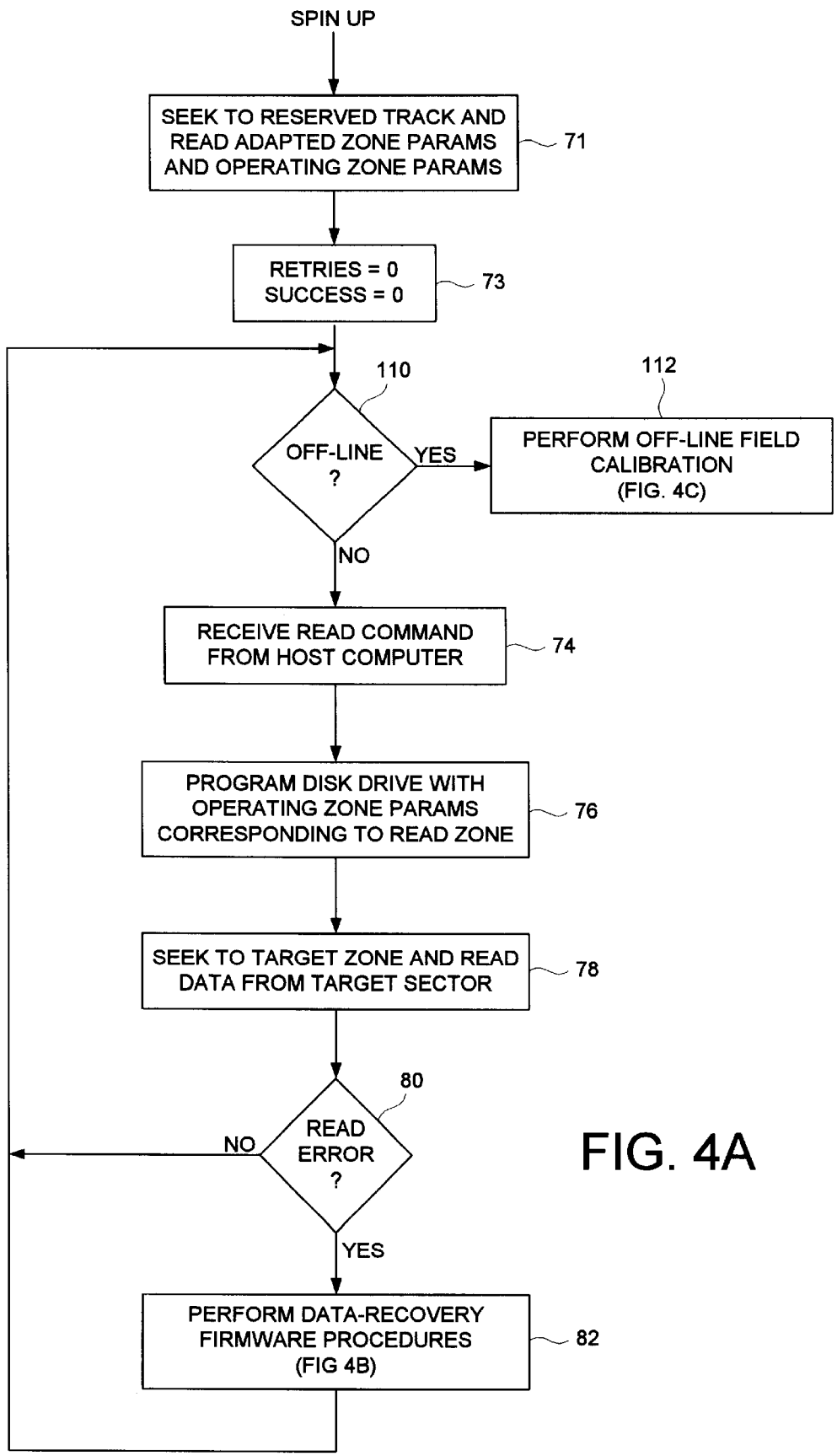
FIG. 4A is a flow chart showing a read operation of a disk drive during an active state.

FIG. 4A is a flow chart according to an embodiment of the present invention. During a spin-up operation at step 71, the disk controller 14 seeks the head 6 to a reserved track to read the adapted zone parameters and the operating zone parameters. At step 73 a retries and success counter for each zone are reset to zero. At step 74 the disk controller 14 receives a command from the host computer to read data from a selected data sector. At step 76 the disk controller 14 programs the disk drive with the operating zone parameters for the zone corresponding to the read operation. At step 78 the disk controller 14 seeks the head 6 to the target zone and reads data from the target data sector. If at step 80 a read error is detected, then at step 82 the data-recovery firmware procedures are executed in an attempt to recover the data from the data sector.

In one embodiment, the disk drive employs an on-the-fly error correction code (ECC) and a read error is detected when the ECC indicates a data sector is unrecoverable on-the-fly. In another embodiment, the disk drive employs a plurality of data-recovery firmware procedures for recovering data stored in a data sector when the ECC indicates a data sector is unrecoverable on-the-fly, and the read error is detected relative to which data-recovery firmware procedure successfully recovers the data sector.

Figure 4B:
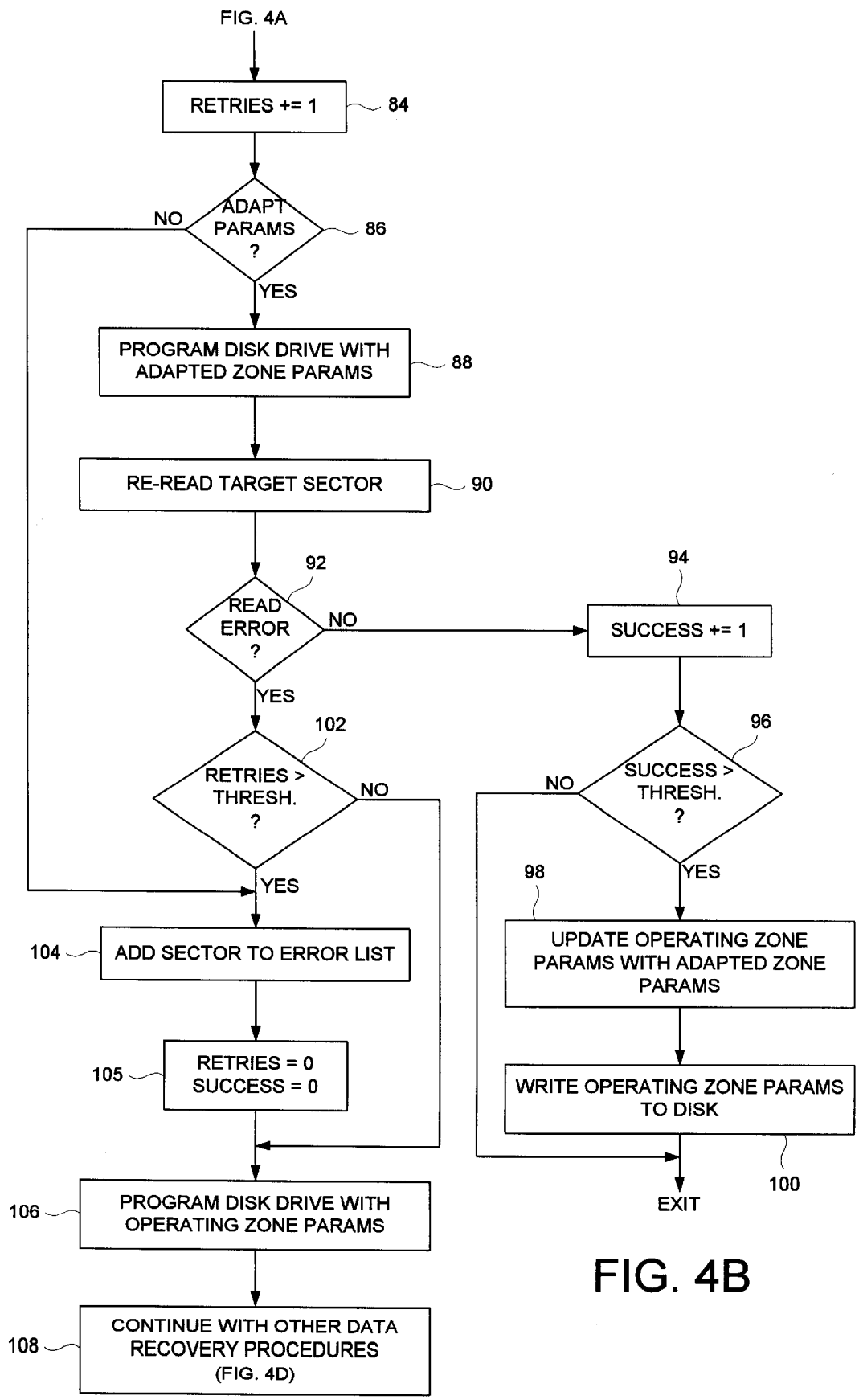
FIG. 4B is a flow chart showing a data-recovery firmware procedure for reading a marginal data sector using adapted zone parameters, and for updating operating zone parameters with the adapted zone parameters if the adapted zone parameters are used successfully to recover a predetermined number of marginal sectors.

FIG. 4B is a flow chart showing a data-recovery firmware procedure for reading a marginal data sector using adapted zone parameters, and for updating operating zone parameters with the adapted zone parameters if the adapted zone parameters are used successfully to recover a predetermined number of marginal data sectors. At step 84 the retries counter for the current zone is incremented. If at step 86 adapted zone parameters exist for the current zone, then at step 88 the disk controller 14 programs the disk drive with the adapted zone parameters and at step 90 the data sector is re-read. If at step 92 a read error is not detected, then at step 94 the success counter for the zone is incremented. If at step 96 the success counter exceeds a predetermined threshold, then at step 98 the operating zone parameters are updated with the adapted zone parameters, and at step 100 the updated operating zone parameters are written to the disk 4 for non-volatile storage. If a read error is detected at step 92, then at step 102 the retries counter for the zone is compared to a threshold. If the retries counter exceeds the threshold, then at step 104 an entry for the data sector is added to the error list 12 so that the adapted zone parameters for the zone will be recalibrated, and at step 105 the retries and success counters for the zone are reset to zero. Thus, the operating zone parameters are updated with the adapted zone parameters only if the adapted zone parameters are successful in recovering data sectors during m out of n retries. In another embodiment, a sliding average of successful recoveries is maintained and compared to a threshold, and the adapted zone parameters are recalibrated after the sliding average progresses beyond a predetermined distance.

After attempting to recover the data sector using the adapted zone parameters, at step 106 the disk controller 14 programs the disk drive with the operating zone parameters, and at step 108 the disk controller 14 executes other data-recovery firmware procedures in an attempt to recover the data sector.

Figure 4C:
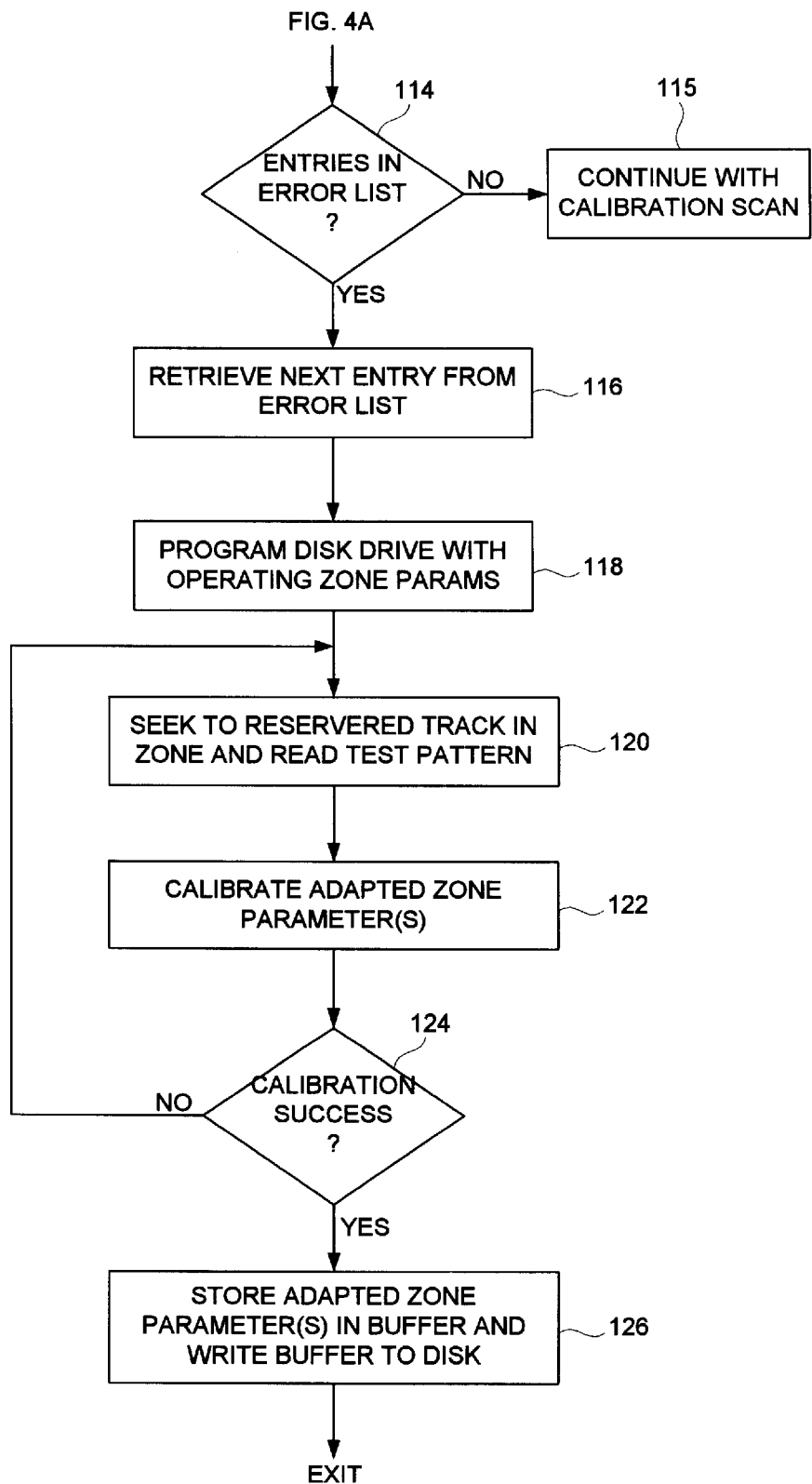
FIG. 4C is a flow chart showing an off-line field calibration procedure driven by a list of read errors.

Returning again to FIG. 4A, if at step 110 the disk controller 14 is in an off-line state, then at step 112 the disk controller 14 executes an off-line field calibration of the zone parameters. An embodiment of the off-line field calibration procedure is outlined in the flow diagram of FIG. 4C. At step 114 the disk controller 14 determines whether any entries exist in the error list 12. If there are no entries in the error list 12, then at step 115 the disk controller 14 continues with a calibration scan of the entire disk 4 wherein the zone parameters are periodically recalibrated for every zone. If there are entries in the error list 12 at step 114, then at step 116 the next entry from the error list 12 is retrieved and at step 118 the disk controller 14 programs the disk drive with the operating zone parameters corresponding to the entry in the error list 12. At step 120 the disk controller 14 seeks the head 6 to a reserved track of the target zone in order to read a test pattern. At step 122 at least one of the adapted zone parameters is calibrated in response to reading the test pattern. If at step 124 the calibration is determined to have failed, then the calibration process is repeated. Otherwise, at step 126 the new adapted zone parameter(s) is stored in the buffer 48, and the buffer written to the disk 4 for non-volatile storage.

Figure 4D:
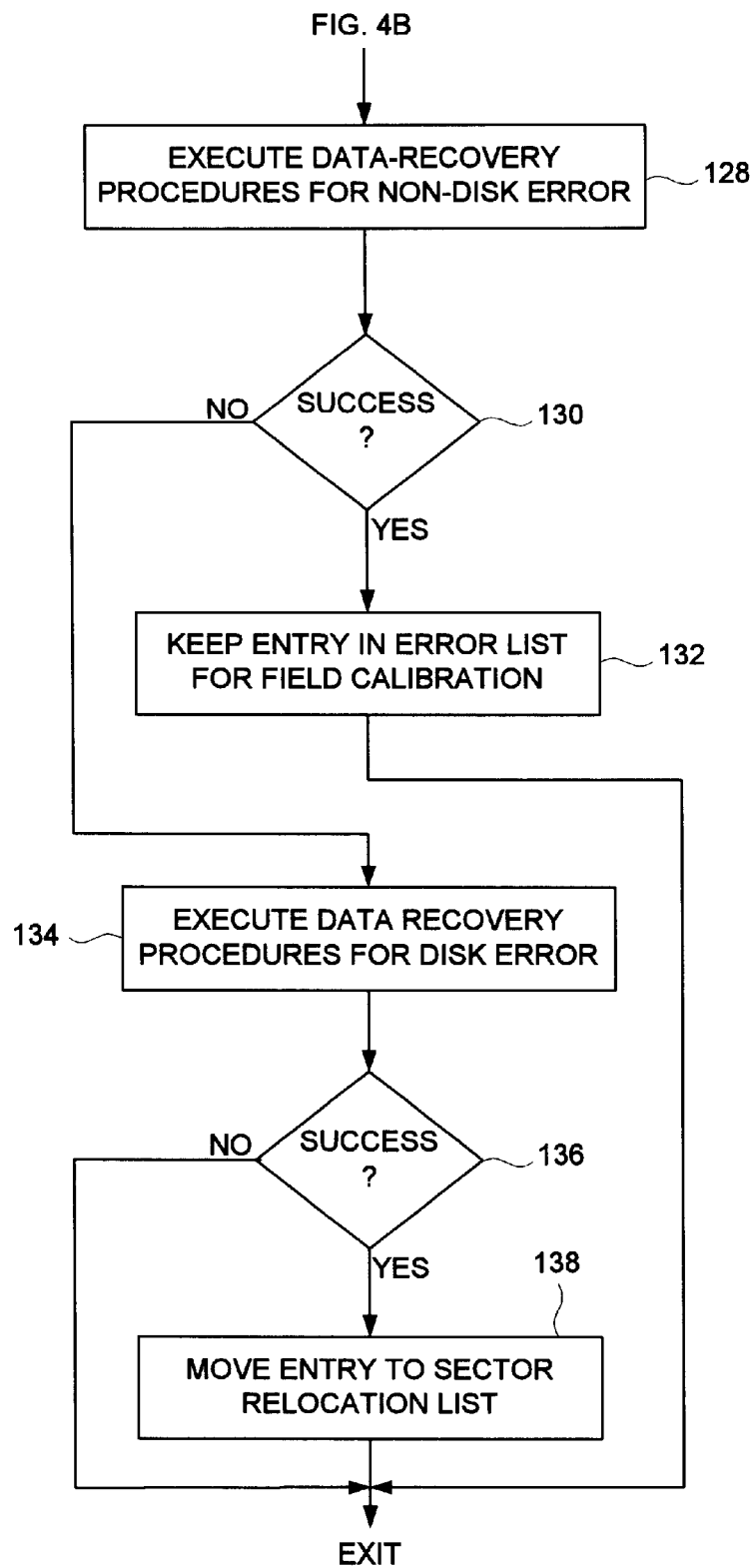
FIG. 4D is a flow chart showing disk error data-recovery firmware procedures and non-disk-error data recovery firmware procedures, wherein an entry is added to the error list for use during the off-line field calibration when a non-disk error data-recovery firmware procedure is successful in recovering a marginal sector.

FIG. 4D is a flow chart according to an embodiment of the present invention showing disk error data-recovery firmware procedures and non-disk-error data recovery firmware procedures, wherein an entry is added to the error list 12 for use during the off-line field calibration when a non-disk error data-recovery firmware procedure is successful in recovering a marginal sector. A disk error may be caused, for example, by a defect on the disk 4 such as a thermal asperity, whereas a non-disk error may be caused, for example, by sub-optimal zone parameters. Examples of disk-error and non-disk error data-recovery firmware procedures are disclosed in the above-referenced co-pending patent application entitled "DISK DRIVE HAVING DATA-GUARDING FIRMWARE". At step 128 the disk controller 14 executes the data-recovery firmware procedures that correlate highly with non-disk errors. If at step 130 one of the data-recovery firmware procedures was successful in recovering data from a marginal data sector, then at step 132 the entry added to the error list 12 at step 104 of FIG. 4B is retained so that the off-line field calibration procedure will be executed for the zone. Otherwise, at step 134 the disk controller 14 executes the data-recovery firmware procedures that correlate highly with a disk error. If at step 136 one of the data-recovery firmware procedures was successful in recovering data from a marginal data sector, then at step 138 the entry added to the error list 12 is moved to a sector relocation list so that the marginal data sector will be relocated rather than recalibrating the adapted zone parameters.

In one embodiment, the zone parameter(s) recalibrated during the off-line field calibration procedure is selected relative to which data-recovery firmware procedure successfully recovers a marginal data sector within the zone. For example, if one of the non-disk error data-recovery firmware procedures of step 128 correlates highly with sub-optimal equalizer coefficients, the zone parameters selected for recalibration during the off-line field calibration are the equalizer coefficients in the read/write channel 36.

We claim:
1. A disk drive comprising:
   (a) a disk comprising:
       a plurality of tracks including a plurality of data tracks and a plurality of reserved tracks; and a plurality of embedded servo sectors dispersed circumferentially around the tracks, wherein:
  the tracks are banded together to form a plurality of zones;
  each data track comprises a plurality of data sectors each comprising a first number of bits for storing user data;
  each reserved track comprises calibration sectors each comprising a second number of bits for storing a calibration test pattern; and
  the second number of bits is greater than the first number of bits;
(b) a head actuated radially over the disk for writing user data to and reading user data from the data sectors, and for reading the calibration test pattern from the calibration sectors;
(c) a plurality of zone parameters used to program the disk drive to read user data from a data sector located in a selected one of the plurality of zones; and
(d) a disk controller for calibrating the zone parameters by executing a calibration procedure, wherein the calibration procedure reads the calibration test pattern from at least one of the calibration sectors.

2. The disk drive as recited in claim 1, wherein at least one of the calibration sectors extends from one servo sector to the next servo sector.

3. The disk drive as recited in claim 1, wherein each calibration sector comprises a preamble and sync mark.

4. A method of calibrating a zone parameter of a disk drive in the field, the disk drive comprising a disk comprising a plurality of tracks including a plurality of data tracks and a plurality of reserved tracks, and a plurality of embedded servo sectors dispersed circumferentially around the tracks, the tracks banded together to form a plurality of zones, each data track comprises a plurality of data sectors each comprising a first number of bits for storing user data, and each reserved track comprises calibration sectors each comprising a second number of bits for storing a calibration test pattern, the second number of bits being greater than the first number of bits, the method comprising the steps of:
  (a) actuating a head radially over the disk for writing data to and reading data from the data sectors, and for reading the calibration test pattern from the calibration sectors; and
  (b) calibrating the zone parameter by executing a calibration procedure, wherein the calibration procedure reads the calibration test pattern from at least one of the calibration sectors.

5. The method of calibrating a zone parameter of a disk drive as recited in claim 4, wherein at least one of the calibration sectors extends from one servo sector to the next servo sector.

6. The method of calibrating a zone parameter of a disk drive as recited in claim 4, wherein each calibration sector comprises a preamble and sync mark.

* * * * *